(12) United States Patent
MacMullan et al.

(10) Patent No.: US 11,432,163 B2
(45) Date of Patent: Aug. 30, 2022

(54) SYSTEMS AND METHODS FOR SCALABLE, RELIABLE, AND DISTRIBUTED SPECTRUM ACCESS SYSTEM PROCESSING

(71) Applicant: Federated Wireless, Inc., Arlington, VA (US)

(72) Inventors: Samuel Jay MacMullan, Carlisle, MA (US); Sepehr Mehrabanzad, Wellesley, MA (US)

(73) Assignee: FEDERATED WIRELESS, INC., Arlington, VA (US)

( * ) Notice: Subject to any disclaimer, the term of this patent is extended or adjusted under 35 U.S.C. 154(b) by 0 days.

(21) Appl. No.: 17/117,517

(22) Filed: Dec. 10, 2020

(65) Prior Publication Data

US 2021/0195429 A1   Jun. 24, 2021

Related U.S. Application Data

(60) Provisional application No. 62/949,539, filed on Dec. 18, 2019.

(51) Int. Cl.
*H04W 16/14* (2009.01)
*H04W 24/02* (2009.01)
(Continued)

(52) U.S. Cl.
CPC ........... *H04W 16/14* (2013.01); *H04W 24/02* (2013.01); *H04W 72/0453* (2013.01); *H04W 72/082* (2013.01)

(58) Field of Classification Search
CPC . H04W 16/14; H04W 24/02; H04W 72/0453; H04W 72/082
See application file for complete search history.

(56) References Cited

U.S. PATENT DOCUMENTS

| 2012/0142382 | A1 | 6/2012 | Stanforth et al. |
| 2018/0242165 | A1 | 8/2018 | MacMullan et al. |
| 2018/0288621 | A1 | 10/2018 | Markwart et al. |

FOREIGN PATENT DOCUMENTS

| WO | WO 2017/139206 A1 | 8/2017 |
| WO | WO 2019/108277 A1 | 6/2019 |

OTHER PUBLICATIONS

International Search Report and Written Opinion issued in corresponding PCT Application No. PCT/US2020/064192, dated Mar. 18, 2021 (7 pages).

(Continued)

*Primary Examiner* — Joshua L Schwartz
(74) *Attorney, Agent, or Firm* — Finnegan, Henderson, Farabow, Garrett & Dunner, LLP (57) ABSTRACT

Cloud-based systems and methods are provided for assigning shared spectrum resources to secondary users. The methods may comprise receiving, by a central block entity, a request for channel availability from a secondary user to access a shared spectrum in a wireless network, authenticating the secondary user, validating the secondary user, routing the request for channel availability to a managing block entity, receiving available frequency information from the managing block entity, assigning a frequency and an effective isotropic radiated power (EIRP) to the secondary user based on the available frequency information from the managing block entity, and transmitting, to the secondary user, a channel availability response based on the assigned EIRP. The managing block entity may be configured to determine available frequency information based on one or more parameters associated with the secondary user. The channel availability response may comprise a frequency on which the secondary user can transmit.

33 Claims, 6 Drawing Sheets

(51) Int. Cl.
*H04W 72/08* (2009.01)
*H04W 72/04* (2009.01)

(56) References Cited

OTHER PUBLICATIONS

Ponomarenko et al., "Highly Dynamic Spectrum Management Within Licensed Shared Access Regulatory Framework," IEEE, Mar. 6, 2016 (10 pages).

SYSTEMS AND METHODS FOR SCALABLE, RELIABLE, AND DISTRIBUTED SPECTRUM ACCESS SYSTEM PROCESSING

CROSS-REFERENCE TO RELATED APPLICATIONS

This application claims the benefit of U.S. Provisional Application Ser. No. 62/949,539, filed on Dec. 18, 2019, the disclosure of which is hereby incorporated by reference in its entirety.

TECHNICAL FIELD

The present disclosure relates to techniques for shared spectrum access in wireless networks and, more particularly, to cloud-based methods, systems, and apparatuses for assigning shared spectrum resources to secondary users.

BACKGROUND

Radio frequency (RF) spectrum is the foundation for many wireless communications systems in use today, including radar and cellular communications systems. Specified frequency ranges, sometimes identified as bands or channels, in the RF spectrum may be allocated for use by different entities, for different purposes, or in different geographic locations. As used in this disclosure, "spectrum" refers to any frequencies, frequency bands, and frequency channels in the RF spectrum that may be used or allocated for wireless communications.

Because the available RF spectrum is finite, frequency allocations in the spectrum are highly valued and often highly regulated. In the United States, for example, the Federal Communications Commission (FCC) and the National Telecommunication and Information Administration (NTIA) regulate and manage spectrum allocations, allotments, and assignments. Frequency allocation is the process by which the entire RF spectrum is divided into frequency bands established for particular types of service. These frequency allocations are then further subdivided into channels designated for a particular service or "allotment." Assignment refers to the final subdivision of the spectrum in which a party (i.e., cellular operator) receives one or more frequency assignments, in the form of a license, to operate a radio transmitter on specific frequency channels within a particular geographic location.

The system of spectrum allocation, allotment, and assignment is failing to keep pace with the increasing demand for spectrum. There is, therefore, a need to improve how the available spectrum can be efficiently allocated, allotted, and assigned in the face of growing demand. Unless otherwise noted, "allocation" is used in the present disclosure to generally refer to the process by which spectrum is allocated, allotted, and assigned to licensed users.

In view of this increasing demand for spectrum, a dynamic spectrum access (DSA) system may be used to share available spectrum among multiple users. A DSA system, for example, may include a Spectrum Access System (SAS) that manages access to a shared spectrum, such as the 3.5 GHz band recently made available for commercial use in the United States. In another example, a DSA system may be used to share access to unlicensed spectrum, such as Television Whitespace (TVWS), the unassigned television channels. Coordinating and managing multi-user access to a shared spectrum present challenges in a DSA system.

As wireless demands grow, shared spectrum usage is becoming more common, e.g., in TVWS bands and in the 3.5 GHz Federal band. In these environments, a SAS may control spectrum access among users assigned to different priority levels (or "tiers") of spectrum-access privileges. The SAS may implement spectrum management policies for users in each tier. For example, the SAS may be configured to protect spectrum usage by higher-priority "primary users" in shared bands from harmful interference that would result from communications by lower-priority "secondary users." In some cases, such higher-priority primary users may comprise "incumbent" users, such as military or other government users, that had access to a spectrum before that spectrum was shared with other "non-incumbent" or lower-priority secondary users. As used herein, a "user" may refer to a user equipment (such as a mobile phone) or a person using a user equipment as will be apparent in context. In many cases where there are relatively few primary users, spectrum usage by primary users is low, so secondary users can dominate overall resource usage. Nonetheless, in regions with primary users, the SAS should ensure that any spectrum allocations to secondary users will not create unacceptable levels of interference with the primary users. Therefore, in order to allocate spectrum to potentially millions of secondary users in the presence of potentially millions of primary users, there is a need for an improved SAS implementation that is highly scalable and reliable.

SUMMARY

The present disclosure provides techniques for assigning shared spectrum resources to secondary users using a highly scalable, reliable, and distributed SAS. The SAS may use a Radio Environment Map (REM) to manage spectrum access. The REM describes the primary and secondary users and the propagation and interference environment that is impactful to shared spectrum system operations and performance. The REM, for example, may include items such as, but not limited to, user device characteristics and geographic data such as terrain, tree cover, season of the year, elevation, building heights, and many other relevant items that can affect radio signals. The SAS may create precise and high-resolution interference estimates in the REM using sophisticated RF propagation models, such as ray tracing. These propagation models may rely on large static databases, such as building data, floor plans, clutter models, terrain models, base station and mobile user models. Measurements, such as Continuous Wave (CW) and/or UE, and machine learning, based on the measurements, are often used to refine the propagation loss estimates. The interference from secondary users at primary user locations may then be dynamically calculated using a link budget incorporating transmit and receive antenna gains, transmit power, and an RF model to compute the path loss from a secondary user to the primary user location.

The interference may be best represented as a random variable. Commonly, the interference is modeled as log-normally distributed, though other representations are often used in industry, such as Gaussian distributed models. Given the set of random variables characterizing the interference from a set of individual secondary users, statistical means may be applied to compute the interference aggregated across all secondary users. For instance, a Monte Carlo approach or convolution of distributions can be used to compute the statistical distribution of the aggregate interference. Measurements can be used to refine the interference estimate from RF models. Such measurements could include, for example, received signal strength, bit or block error rate, handoff performance, and/or message latency. Subsequently, the SAS may protect incumbent users by ensuring that the median, mean, or some percentile of the cumulative distribution function (e.g., 95% percentile) of the aggregate interference is less than a specified threshold. Such calculations are run over all secondary users, such as Citizens Broadband Radio Service Devices (CBSDs), secondary users that are co-channel with a particular primary user, and/or secondary users within a certain frequency range. The REM and interference calculations may also be used in algorithms to manage interference among secondary users while maximizing spectrum efficiency, such as by following General Authorized Access (GAA) coexistence procedures.

The SAS may use several methods to protect primary users from secondary user interference. These methods may include, but are not limited to ensuring some statistical measure (e.g., mean) of the aggregate interference from secondary users is less than some threshold at a primary user receiver, limiting some statistical measure of the interference from each secondary user to some threshold at a primary user receiver, and/or preventing secondary users from operating within protection zones (also known as exclusion zones) surrounding a primary user. The interference thresholds and protection zones may vary depending on the primary and secondary user parameters, such as height, transmit power, signaling protocol (e.g., LTE, WiMAX, Wi-Fi). The protection methodologies may be applied at fixed-times, for example, during Coordinated Periodic Activities among SASs (CPAS) for Citizens Broadband Radio Service (CBRS) and/or when the secondary user device requests service (e.g., when Citizens Broadband Radio Service Devices (CBSDs) register and/or perform spectrum inquiries or grant requests).

Accordingly, the SAS implementation needs to be highly scalable given that the SAS may be responsible for allocating spectrum to potentially millions of secondary users in the presence of potentially millions of primary users. Each secondary user allocation typically requires a computationally complex evaluation leveraging the REM with interference and secondary user coexistence calculations to best provide shared resources that maximize overall secondary user spectrum efficiency while protecting primary users from harmful interference from secondary users. In addition, new incumbents can emerge, e.g., mobile radar systems, that may require complex SAS computations to quickly reassign spectrum to a significant number of secondary users that potentially interfere with the new incumbents. Quick reassignment may be critical to minimize secondary user disruption while protecting the new incumbent from harmful interference from secondary users.

Moreover, secondary users may desire assignments within seconds of resource requests, thereby requiring the SAS to rapidly perform the complex evaluation. Secondary user locations could be spread geographically across a wide region (e.g., the continental US, Europe, North America) and, as such, the networking methodology may need to be carefully designed to ensure low-latency communications over large areas. Further, secondary user resource requests may be clustered, e.g., a large number of requests may arrive in a short period of time due to a large customer deployment, placing further demands on SAS computation complexity and network I/O. In some circumstances, the REM used in secondary user assignments and coexistence calculations may require a very large database, for example, with 3D building and vegetation models, high-resolution terrain and land category models, population data, interference maps, and/or primary/secondary user device characteristics. Therefore, the SAS calculations may require use of large portions of this database, placing demands on the system I/O. Additionally, the demands on computation power, storage, network I/O, and system I/O may need to be satisfied in a highly reliable manner such that primary user protection from secondary user interference is guaranteed with a high probability close to 1 (e.g., 0.99999), and secondary user service may need to be reliably maintained with a similarly high probability.

The present disclosure provides a minimal latency, highly scalable, and reliable solution for a shared spectrum system that employs a cloud-based distributed computing architecture. The cloud-based distributed computing architecture may comprise one or more block entities and a central entity. Each of the entities may comprise a collection of processor(s), storage unit(s), and interface(s). In this architecture, primary user protection and secondary user optimization responsibility may be distributed across one or more block entities with a central entity performing some block result consolidation and signaling. The central entity may also be responsible for CBSD authorization and validation, as well as routing CBSD requests to one or more block entities. In some embodiments, the primary users may be partitioned into geographical regions, and each block entity may be configured to protect the primary users in a particular non-overlapping geographical region while performing coexistence operations on the secondary users that are located inside or within a certain distance of the region. Additionally or alternatively, other block partitioning methods may be used, such as segregating primary users based on primary user type (e.g., Environmental Sensing Capability (ESC) sensors, Department of Defense (DoD) Radars, etc.) or the availability of block entity resources, or assigning a block entity to a specific primary user.

The disclosed embodiments comprise, for example, cloud-based methods, systems, and computer-readable mediums that may be used for assigning shared spectrum resources to secondary users. The method may comprise receiving, by a central block entity, a request for channel availability from a secondary user to access a shared spectrum in a wireless network, authenticating the secondary user, validating the secondary user, routing the request for channel availability to a managing block entity, receiving available frequency information from the managing block entity, assigning a frequency and an effective isotropic radiated power (EIRP) to the secondary user based on the available frequency information from the managing block entity, and transmitting, to the secondary user, a channel availability response based on the assigned EIRP. The managing block entity may be configured to determine available frequency information based on one or more parameters associated with the secondary user. The channel availability response may comprise the assigned frequency on which the secondary user can transmit. In some embodiments, the one or more parameters associated with the secondary user may comprise at least one of an antenna gain of the secondary user, a transmit power of the secondary user, or a radio frequency (RF) propagation model of the secondary user. Additionally or alternatively, the managing block entity may also be configured to transmit the channel availability response to the secondary user.

In some embodiments, a plurality of primary users may be partitioned into geographical regions, and the managing block entity may be associated with a subset of the plurality of primary users in a non-overlapping geographical region.

In other embodiments, signing the EIRP to the secondary user may further comprise receiving one or more EIRPs associated with the secondary user from one or more managing block entities, determining a minimum EIRP from the one or more received EIRPs, and assigning the minimum EIRP to the secondary user. In some embodiments, the managing block entity may be associated with a geographical region of primary users, the managing block entity may be further configured to determine a list of secondary users within the geographical region that causes an aggregate interference to the primary users to exceed a predetermined threshold and transmit the list to the central block entity, and the central block entity may be configured to suspend, terminate, reassign, or reauthorize the secondary users in the list using a heartbeat exchange.

In some embodiments, the managing block entity may be further configured to perform distributed coexistence calculations at fixed times among a set of secondary users within a predetermined distance from a regional boundary of the managing block entity. Performing distributed coexistence calculations may comprise determining interference from one secondary user to another secondary user within the predetermined distance from the regional boundary of the managing block entity. Additionally or alternatively, the managing block entity may be further configured to determine a list of all pairs of secondary users that interfere with each other within the predetermined distance from the regional boundary of the managing block entity. The managing block entity may be further configured to compute a coverage contour associated with each of the secondary users, determine whether the coverage contours overlap with one another by a predetermined amount, and determine the list of all pairs of secondary users that interfere with each other based on the overlaps in the coverage contours.

In other embodiments, the managing block entity may be further configured to determine whether the secondary user is authorized to immediately transmit the frequency or whether the secondary user needs to wait before transmitting on the frequency. In yet another embodiment, at least one of the managing block entity or one or more secondary block entities is configured to compute a coverage contour associated with each secondary user within a respective geographical region, calculate, via a link budget, an interference caused by each secondary user to one or more primary users within the respective geographical region, and update a Radio Environment Map (REM) based on the calculated interference to manage spectrum access. In some embodiments, at least one of the central block entity, the managing block entity, or one or more secondary block entities may comprise one or more redundant processors and one or more redundant databases.

BRIEF DESCRIPTION OF THE DRAWINGS

The accompanying drawings, which are incorporated in and constitute a part of this disclosure, illustrate various exemplary disclosed embodiments. In the drawings.

DETAILED DESCRIPTION OF DISCLOSED EMBODIMENTS

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components and steps illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope of the invention is defined by the appended claims.

Figure 1:
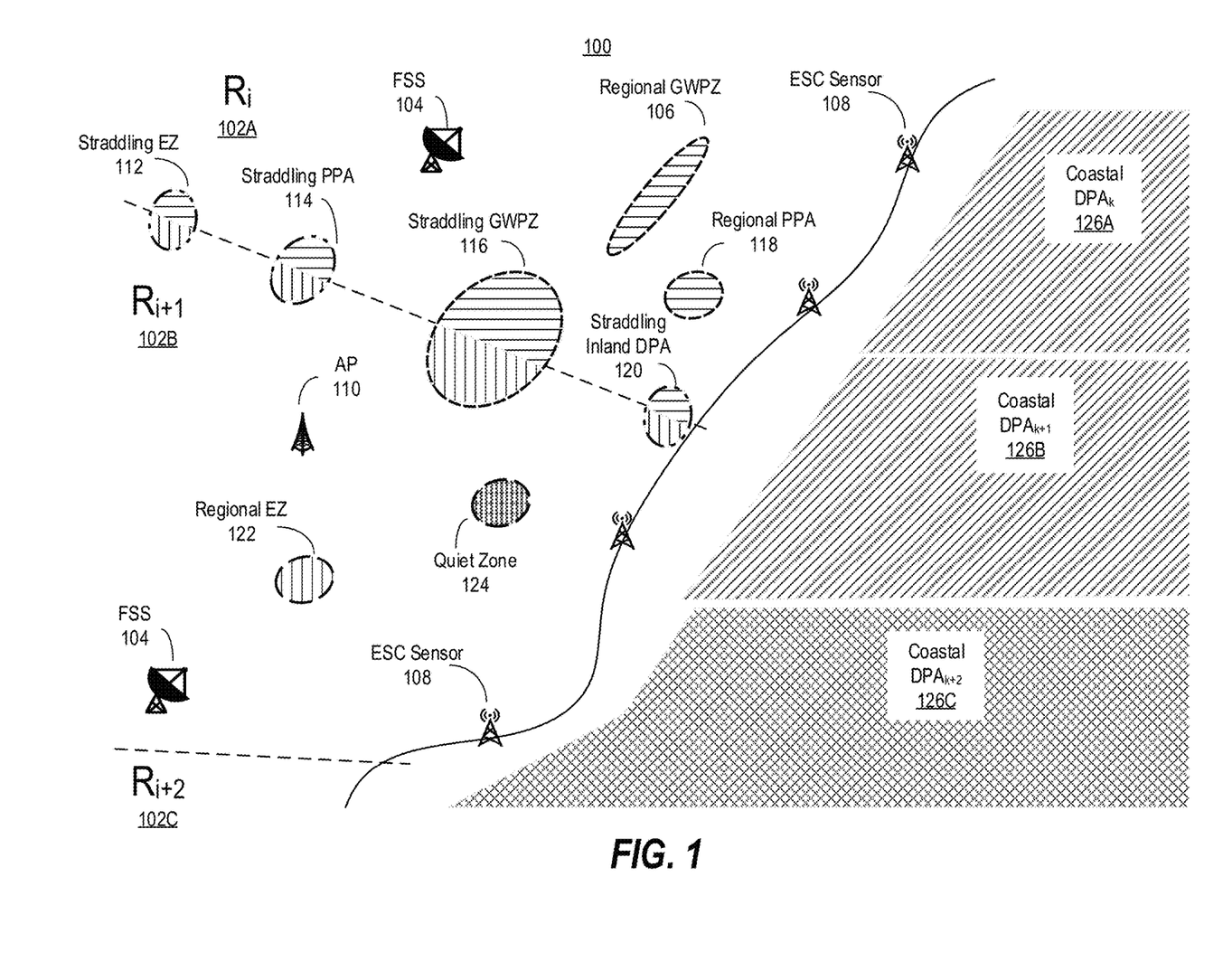
FIG. 1 depicts a schematic diagram illustrating an exemplary distributed block processing system in accordance with certain disclosed embodiments.

FIG. 1 illustrates a schematic diagram illustrating an exemplary distributed block processing spectrum access system 100 in accordance with certain disclosed embodiments. Various secondary users, such as CBSDs, may cause interference to an incumbent user due to their transmissions. Accordingly, the distributed spectrum access system 100 may be configured to ensure that the secondary users do not cause excess interference to the incumbent user. As shown in FIG. 1, for example, an area may be geographically partitioned into a plurality of regions 102A-C. Each of the geographical regions 102A-C may include one or more incumbent users and/or one or more secondary users. As discussed below, in some embodiments, each region may be associated with a block entity of a spectrum access system (SAS). The block entity may be configured to protect one or more incumbent users within the respective region from interference caused by one or more secondary users within the respective region. Accordingly, region 102A may be associated with a first block entity, region 102B may be associated with a second block entity, and region 102C may be associated with a third block entity. The block entity responsible for each region may be physically located within the respective region. In other embodiments, the block entity responsible for each region may be located elsewhere, for example, outside of the respective region.

In some embodiments, each block entity of the SAS may comprise one or more cloud-based processors with access to incumbent databases. Incumbent databases may include information associated with each region and/or information associated with each secondary user, such as a CBSD, operating in or near each region. In some embodiments, to ensure reliability of system 100, each block entity may comprise one or more redundant processors and databases. Accordingly, if one processor associated with the block entity fails, the block entity can switch to another redundant processor and use the redundant, backup processor. Additionally or alternatively, one or more copies of a database associated with a block entity may be maintained such that if a primary database becomes corrupted or lost, the block entity can switch to and use a backup database.

Referring to FIG. 1, in some embodiments, the SAS may be configured to protect incumbent users including, but not limited to, fixed satellite service (FSS) earth stations 104, regional grandfathered wireless protection zones (GWPZs) 106 including grandfathered wireless broadband licensee (GWBL) devices, straddling GWPZs 116, coastal dynamic protection areas (DPAs) 126A-C configured to protect federal radar systems, straddling inland DPAs 120, regional priority access license (PAl) protection areas (PPAs) 118, straddling PPAs 114, environmental sensing capability (ESC) sensors 108, quiet zones (QZs) 124 surrounding sensitive radio receivers, regional exclusion zones (EZs) 122 surrounding inland federal radar systems, and/or straddling EZs 112. As shown in FIG. 1, straddling incumbent users may refer to incumbent users that are straddling between a plurality of regions. For example, straddling EZ 112, straddling PPA 114, straddling GWPZ 116, and straddling inland DPA 120 may straddle between regions 102A and 102B. Accordingly, block entities in each region 102A and 102B may both account for straddling EZ 112, straddling PPA 114, straddling GWPZ 116, and straddling inland DPA 120 to protect these incumbent users. In region 102B, one or more block entities of the spectrum access system 100 may be configured to protect incumbent users, such as regional EZ 122, QZ 124, FSS 104, ESC sensors 108, straddling EZ 112, straddling PPA 114, straddling GWPZ 116, and straddling inland DPA 120 from interference caused by secondary users associated with AP 110, such as CBSDs.

For different types of incumbent users, system 100 may be configured to implement different protection methods to protect the incumbent users from interference caused by secondary users. In some embodiments, in order to protect FSS 104, GWPZs 106, 116, DPAs 120, 126A-C, PPAs 114, 118, and ESC sensors 108, system 100 may need to aggregate interference calculations to ensure incumbent user interference protection. In contrast, for QZs 124 and EZs 112, 122, system 100 may be configured to ensure that secondary users, such as CBSDs, are not allowed to transmit within a pre-defined area surrounding the incumbent users. In some embodiments, for FSS 104 and ESC sensors 108, system 100 may be configured to aggregate interference calculations at a certain point, such as a location of FSS 104. In other embodiments, for GWPZs 106, 116, DPAs 120, 126A-C, and PPAs 114, 118, system 100 may be configured to aggregate interference calculations over an area, such as over pre-defined grid points within the GWPZ 106, 116 or PPA 114, 118. In some embodiments, GWPZs 106, 116, DPAs 120, 126A-C, and PPAs 114, 118 may be managed by a single block entity. Alternatively, GWPZs 106, 116, DPAs 120, 126A-C, and PPAs 114, 118 may be managed by a plurality of block entities, for example when the incumbent protection areas straddle multiple regions (e.g., straddling EZ 112, straddling PPA 114, straddling GWPZ 116, and straddling inland DPA 120).

As discussed above, distributed SAS calculations for primary user and ESC sensor protection and secondary user coexistence may occur at fixed times. For example, the distributed SAS calculations may occur at Coordinated Periodic Activities among SASs (CPAS) and/or upon CBSD signaling (e.g., registration, spectrum inquiries, grant requests). In some embodiments, fixed-time processing by the SAS, such as system 100, may be distributed across a plurality of block entities and their processors. Accordingly, methods for incumbent protection and methods for secondary user (e.g., CBSD) coexistence, such as ensuring CBSD-to-CBSD interference is minimized while CBSD spectrum assignments are maximized, may be distributed.

Figure 2:
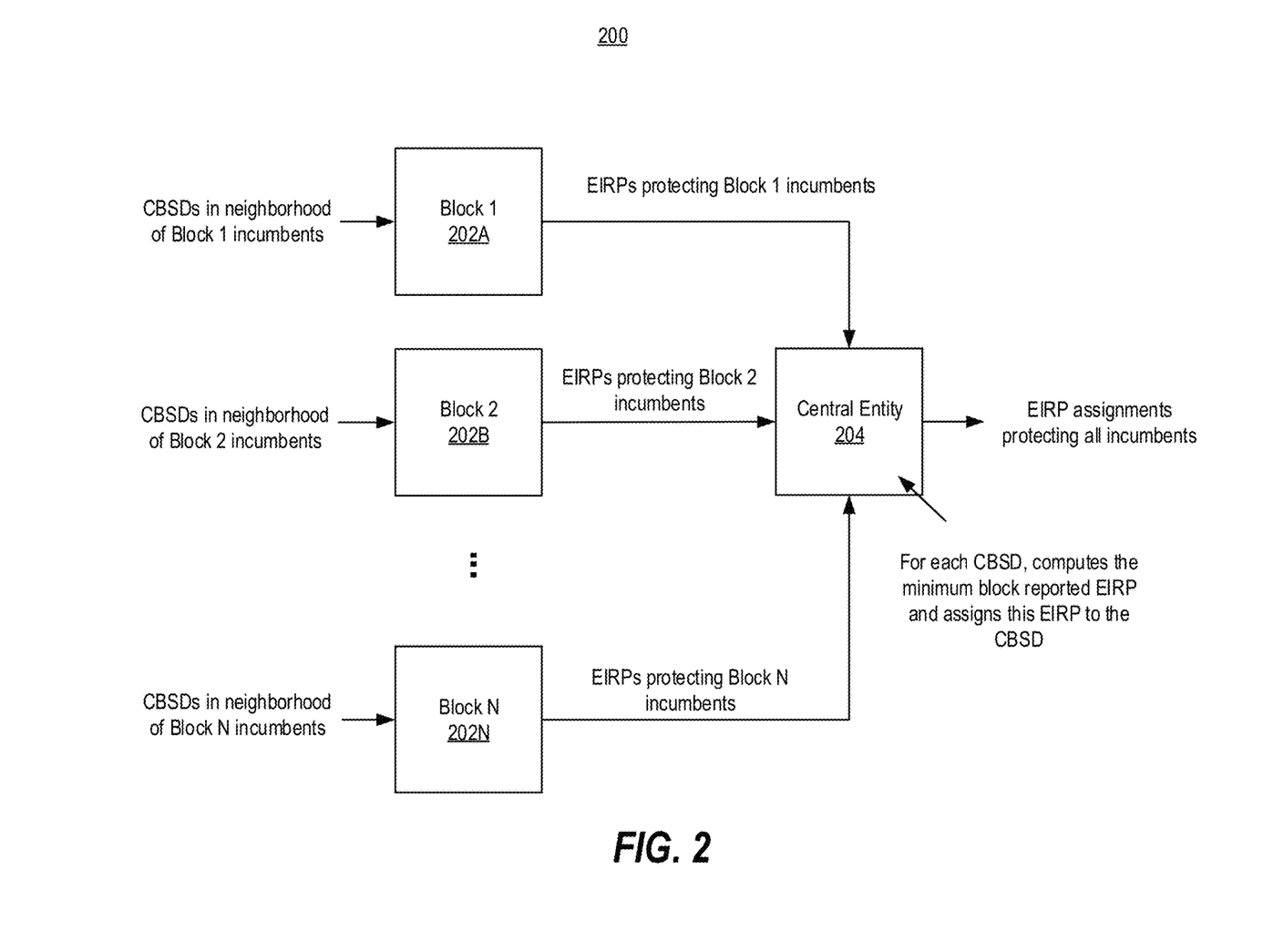
FIG. 2 depicts a schematic diagram of an exemplary distributed method of assigning an effective isotropic radiated power (EIRP) to a secondary user in accordance with certain disclosed embodiments.

For example, FIG. 2 illustrates a schematic diagram of an exemplary distributed method 200 of assigning an effective isotropic radiated power (EIRP) to a secondary user in accordance with certain disclosed embodiments. As shown in FIG. 2, block entities 202A-202N may be configured to operate on a set of secondary users, such as CBSDs, within the neighborhood of one or more primary users within a region associated with each respective block entity. The neighborhood of the one or more primary users may vary depending on the type of incumbent user and may also be defined as a distance from the one or more primary users. By way of example, for area incumbents, the distance may be the closest point in the protection area relative to each secondary user. In some embodiments, the neighborhood distance may vary depending on one or more parameters associated with the secondary users. For example, high power CBSDs may have a larger neighborhood distance than low power CBSDs, and the distance can be a function of the CBSD transmit power and/or antenna pointing angle.

In some embodiments, each block entity 202A, 202B, 202N may perform interference calculations, such as intermediate calculations of the CBRS Iterative Allocation Process (IAP) and DPA move list calculations, as well as coexistence calculations. The intermediate variables may be shared with a central entity 204 for final determination of CBSD transmit power and frequency assignment and DPA protection. A secondary user, such as a CBSD, may be in the neighborhood of the incumbent users in multiple regions, and accordingly, each block entity associated with the multiple regions may determine fair EIRP assignments that maximize CBSD coverage while protecting its respective incumbent users. Each block entity may share its determined EIRP with the central entity 204, and the central entity 204 may be configured to compute the minimum EIRP reported by the block entities and assign the minimum EIRP to the CBSD.

Accordingly, referring to FIG. 2, block entity 202A may operate on CBSDs in the neighborhood of incumbent users within its region R1 and may compute EIRPs for the CBSDs such that one or more incumbent users in region R1 are protected. Similarly, block entity 202B and block entity 202N may compute EIRPs for CBSDs in the neighborhood of incumbent users in their respective regions and report the EIRPs to the central entity 204. The central entity 204 may receive the EIRPs from each block entity 202A, 202B, 202N and determine the minimum received EIRP. Then, the central entity 204 may assign the minimum EIRP to the CBSD, which may be in the neighborhood of incumbent users in one or more regions.

Figure 3:
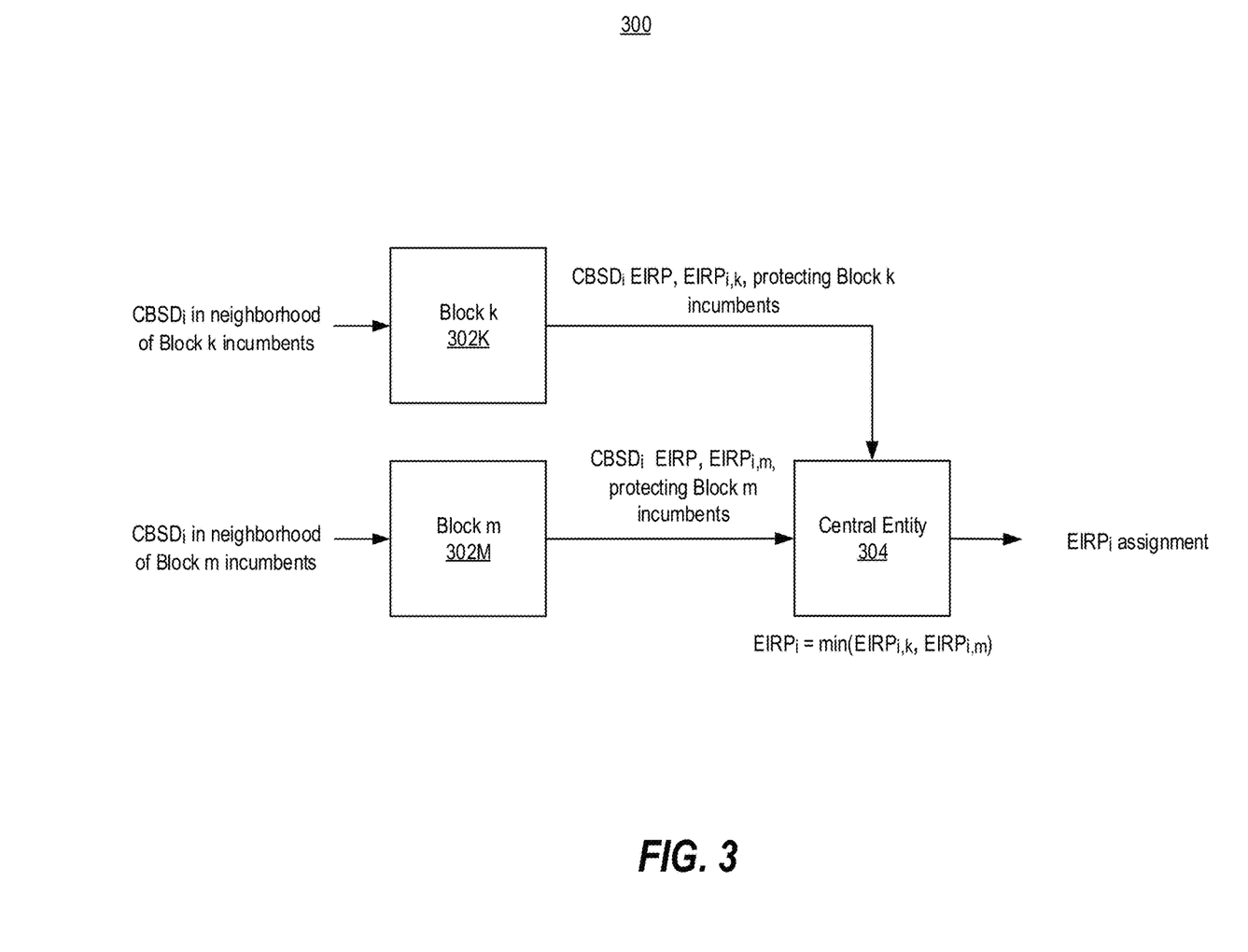
FIG. 3 depicts a schematic diagram of another exemplary distributed method of assigning an effective isotropic radiated power (EIRP) to a secondary user in accordance with certain disclosed embodiments.

In some embodiments, secondary users, such as CBSDs, may be present in multiple regions. As such, a plurality of block entities associated with the multiple regions may be configured to determine EIRPs for the same CBSDs, thereby providing overlapping EIRPs to the central entity. For example, FIG. 3 illustrates a schematic diagram of another exemplary distributed method 300 of assigning EIRP to a secondary user in accordance with certain disclosed embodiments. Referring to FIG. 3, block entity 302K may operate on CBSDs in the neighborhood of incumbent users within its region K and may compute EIRPs for the CBSDs such that one or more incumbent users in region K are protected. Similarly, block entity 302M may operate on CBSDs in the neighborhood of incumbent users within its region M and may compute EIRPs for the CBSDs such that one or more incumbent users in region M are protected. In some embodiments, a number of CBSDs (i.e., $CBSD_i$) may be present in both region K and region M. Therefore, block entity 302K and block entity 302M may both perform CPAS operations to compute EIRPs for $CBSD_i$ present in regions K and M, respectively. Block entity 302K may calculate $EIRP_{i,k}$ for $CBSD_i$ which ensures the protection of incumbent users in region K, and block entity 302M may calculate $EIRP_{i,m}$ for $CBSD_i$, which ensures the protection of incumbent users in region M. Afterwards, both $EIRP_{i,k}$ and $EIRP_{i,m}$ may be reported to central entity 304 by block entity 302K and block entity 302M, respectively. After receiving both $EIRP_{i,k}$ and $EIRP_{i,m}$, central entity 304 may determine the minimum of $EIRP_{i,k}$ and $EIRP_{i,m}$ and assign the minimum EIRP to $CBSD_i$.

In some embodiments, DPA protection calculations may also be distributed, which differs from other SAS protection algorithms using aggregate interference calculations in that, rather than reducing all CBSD EIRPs to ensure the aggregate interference does not exceed a predetermined threshold, the DPA calculations may rank CBSDs by their interference contribution to grid points within the DPA given the requested CBSD EIRP. Afterwards, a SAS may form a move list that may include one or more CBSDs causing the most interference such that if the CBSDs in the move list are not transmitting, the aggregate interference from the remaining CBSDs does not exceed a predetermined threshold at each DPA grid point. For example, FIG. 4 illustrates a schematic diagram of an exemplary distributed method 400 of performing Dynamic Protection Area (DPA) protection calculations in accordance with certain disclosed embodiments.

Figure 4:
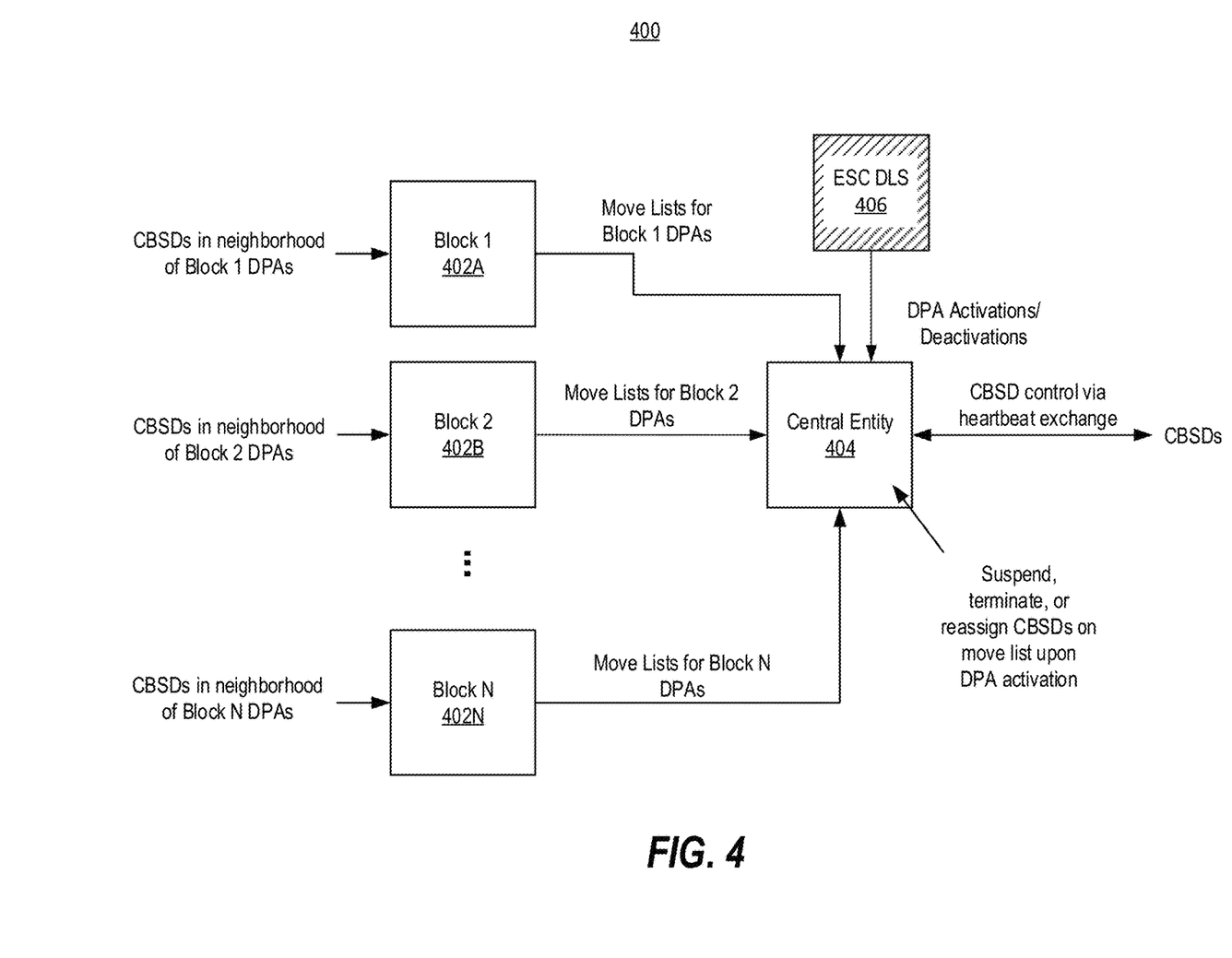
FIG. 4 depicts a schematic diagram of an exemplary distributed method of performing Dynamic Protection Area (DPA) protection calculations in accordance with certain disclosed embodiments.

Referring to FIG. 4, a SAS may distribute DPA calculations among a plurality of block entities 402A-402N and a central entity 404. Block entity 402A may operate on CBSDs in the neighborhood of DPAs within its region 1, block entity 402B may operate on CBSDs in the neighborhood of DPAs within its region 2, and block entity 402N may operate on CBSDs in the neighborhood of DPAs within its region N. Each block entity 402A-N may perform a move list calculation for each DPA within its respective region. For example, as discussed above, each block entity 402A-N may determine and form a move list, including one or more CBSDs in its respective region that are the most interference such that if the CBSDs in the move list are not transmitting, the aggregate interference from the remaining CBSDs in its respective region does not exceed a predetermined threshold at each DPA grid point After determining a move list, each block entity 402A-N may transmit the move list to the central entity 404.

In some embodiments, an ESC Decision Logic System (DLS) 406 may communicate with the central entity 404 to notify the SAS of DPA activations and deactivations. Based on the communications from ESC DLS 406 and the move lists received from the block entities 402A-N, central entity 404 may determine whether to suspend, terminate, or reassign CBSDs in the move lists upon DPA activation. For example, when central entity 404 receives a notification from ESC DLS 406 of a DPA activation, central entity 404 may suspend, terminate, or reassign CBSDs on the move list associated with the activated DPA using a heartbeat exchange. When central entity 404 further receives a notification from ESC DLS 406 that the DPA is deactivated, central entity 404 may use the heartbeat exchange to reauthorize the CBSDs on the associated DPA move list to transmit.

In addition to applying distributed processing to protect incumbent users from interference by secondary users, block entities may also perform distributed coexistence calculations at fixed times among a set of secondary users, such as those within a certain distance of respective regional boundaries at the start of CPAS. In some embodiments, a distance of about 40 km may be the maximum distance between interfering secondary users, such as CBSDs. In other embodiments, other distances may be considered.

In some embodiments, several additional coexistence operations may be performed by the block entities, such as any operation on CBSDs that does not impact CBSDs in other regions. For example, one of the most processing-intensive coexistence operations may comprise determining which pairs of CBSDs interfere with one another. An adjacency list, for example, may comprise a list of all pairs of CBSDs that interference with one another. In some embodiments, each block entity may be configured to compute an adjacency list for the secondary users within its respective regional boundary. For example, FIG. 5 illustrates a schematic diagram of an exemplary distributed method 500 of performing coexistence calculations in accordance with certain disclosed embodiments.

Figure 5:
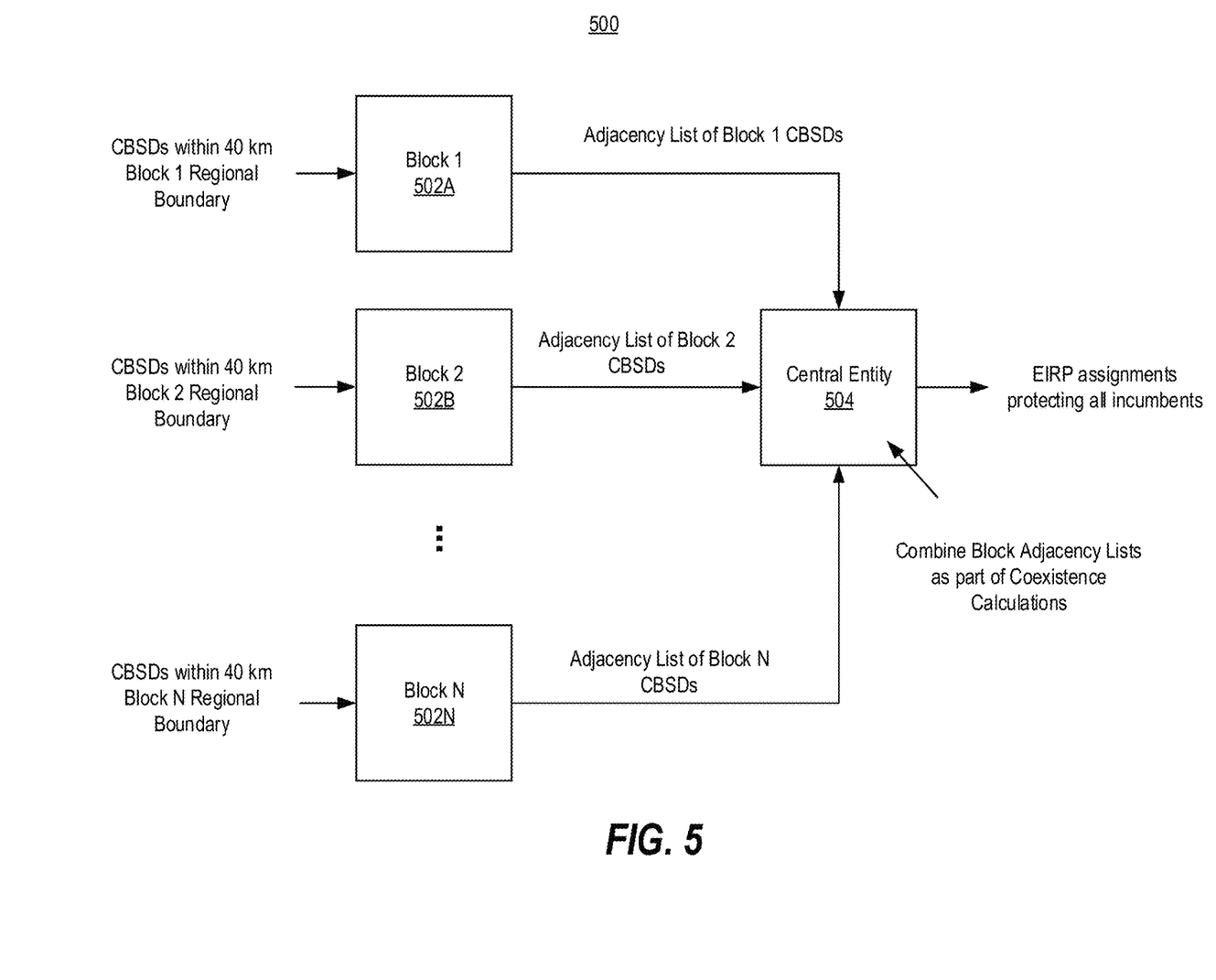
FIG. 5 depicts a schematic diagram of an exemplary distributed method of performing coexistence calculations in accordance with certain disclosed embodiments.

Referring to FIG. 5, block entity 502A may operate on CBSDs within a predetermined distance, such as about 40 km, from its regional boundary, block entity 502B may operate on CBSDs within a predetermined distance, such as about 40 km, from its regional boundary, and block entity 502N may operate on CBSDs within a predetermined distance, such as about 40 km, from its regional boundary. One or more processors of each block entity 502A-N may be configured to compute an adjacency list comprising a list of all pairs of CBSDs that interference with one another within the predetermined distance from its respective regional boundary. By way of example, one or more processors of each block entity 502A-N may determine contours associated with each CBSD and identify any overlapping of CBSD contours within the predetermined distance from its respective regional boundary. Overlapping of CBSD contours that exceed a predetermined amount may suggest that the CBSDs interfere with one another. Therefore, one or more processors of each block entity 502A-N may identify CBSD contour overlaps exceeding the predetermined amount and determine an adjacency list based on the identified CBSD contour overlaps.

Each block entity 502A-N may then report the adjacency list to central entity 504. After receiving the adjacency lists from each block entity 502A-N, central entity 504 of the SAS may use the received adjacency lists to perform subsequent coexistence calculations and to assign EIRPs to the CBSDs. As shown in FIG. 5, adjacency lists are one example of the coexistence calculations that can be distributed. In other embodiments, other coexistence calculations, such as connected set determination, graph coloring, and channel mapping, can be distributed in the SAS, especially in circumstances where a connected set is geographically contained within a single region.

Figure 6:
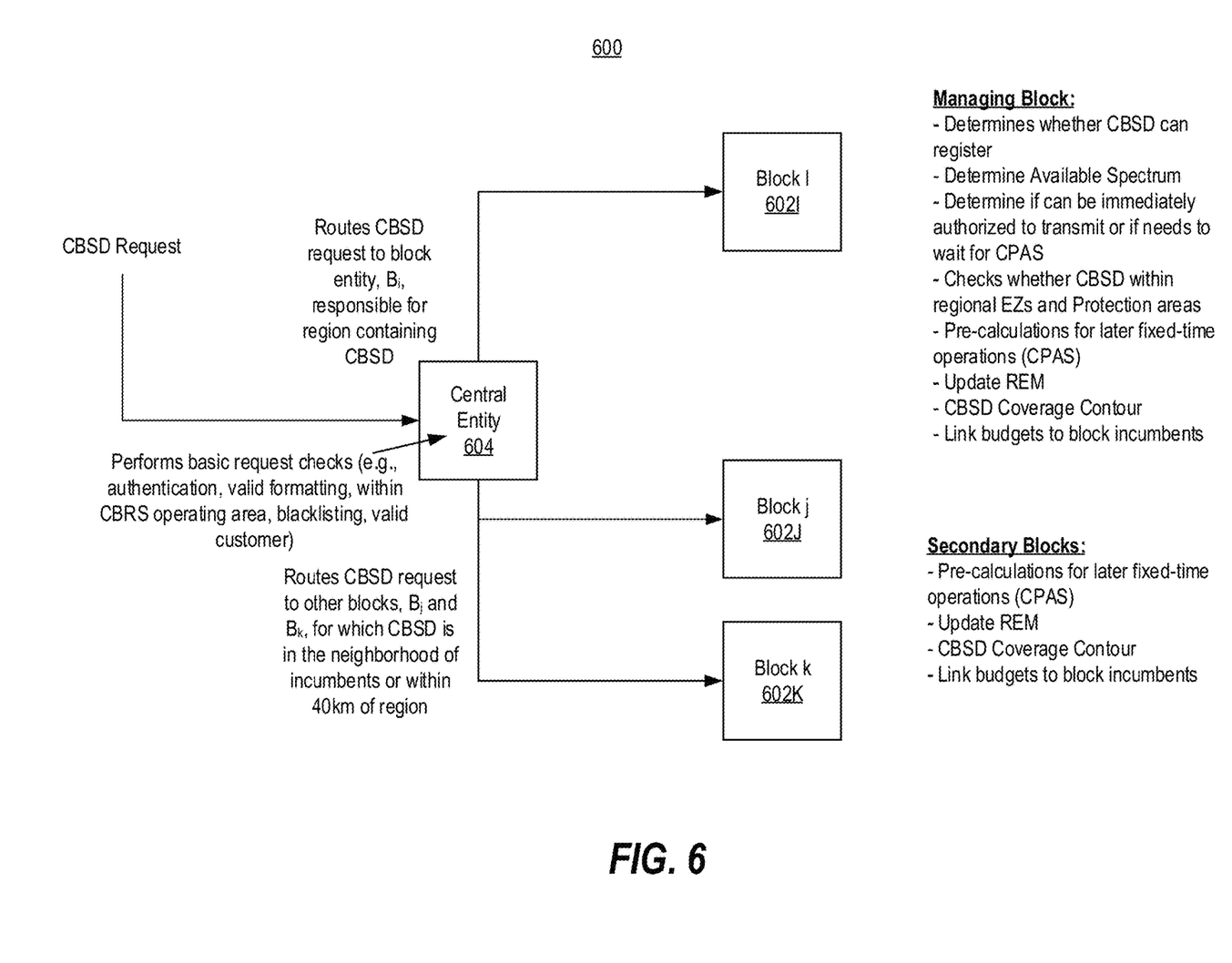
FIG. 6 depicts a schematic diagram illustrating an exemplary method for responding to a service request in accordance with certain disclosed embodiments.

FIG. 6 illustrates a schematic diagram illustrating an exemplary method 600 for responding to a service request in accordance with certain disclosed embodiments. As illustrated in FIG. 6, one or more processors of a central entity 604 of the SAS may be configured to receive service requests from one or more secondary users, such as CBSDs. Upon receiving a service request from the one or more secondary users, one or more processors of the central entity 604 may authenticate the one or more secondary users and validate the one or more secondary users. For example, one or more processors of the central entity 604 may validate whether the message formatting of the service request is correct, ensure that the one or more secondary users is not blacklisted, and ensure that the one or more secondary users is a valid SAS customer.

If the service request passes the authentication and validation, one or more processors of the central entity 604 may route the service request to a managing block entity 602I and other secondary block entities 602J, 602K. Block 602I may be the managing block entity because block 602I may operate on the one or more secondary users requesting the service in the neighborhood of incumbent users within its region. Blocks 602J, 602K may be the secondary block entities, for which the one or more secondary users requesting the service is within the neighborhood of one or more incumbent users within the respective regions and/or within a predetermined distance (e.g., about 40 km) of the respective regional boundaries. The managing block entity 602I and the secondary block entities 602J, 602K may each perform distributed block entity processing operations.

By way of example, one or more processors of the managing block entity 602I may be configured to determine a response to the service request from the one or more secondary users. For example, one or more processors of the managing block entity 602I may determine whether the one or more secondary users can register based on one or more registration parameters. In some embodiments, one or more processors of the managing block entity 602I may be configured to determine spectrum availability information based on one or more parameters associated with the one or more secondary users. One or more processors of the managing block entity 602I may transmit spectrum availability information to the central entity 604 such that the central entity 604 can provide a spectrum inquiry response, such as a channel availability response, to the one or more secondary users. The channel availability response may comprise a frequency on which the one or more secondary users can transmit. Additionally or alternatively, the managing block entity 602I may transmit the channel availability response to the one or more secondary users. For example, the managing block entity 602I may receive the channel availability response from the central entity 604 and transmit the channel availability response to the one or more secondary users.

Upon grant requests, one or more processors of the managing block entity 602I may determine whether the one or more secondary users is immediately authorized to transmit on the frequency or if the one or more secondary users need to wait until the next CPAS for authorization. In some embodiments, the decision by the one or more processors of the managing block entity 602I on when the one or more secondary users can begin transmission may be based on whether the one or more secondary users is within the exclusion zone, such as EZ 112, 122 of FIG. 1, or other protection areas and whether the service request is consistent with coexistence calculations.

In yet another embodiment, one or more processors of the managing block entity 602I may be configured to perform pre-calculations for later fixed-time CBSD operations. For example, pre-calculations may include the computation of each regional secondary user coverage contour, as well as interference from the secondary user to an incumbent user as calculated via link budget incorporating transmit and receive antenna gains, transmit power, and an RF model to compute the path loss from the secondary user to a location of the incumbent user. In some embodiments, the secondary block entities 602I, 602K may perform similar pre-calculations as discussed above. As fixed-time operations, such as CPAS, may be time-bound and may need to be completed within a limited time duration, these distributed pre-calculations may be critical in ensuring that, even with millions of secondary users and incumbent users, the SAS can reliably scale to service all secondary users while protecting all incumbent users.

While illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. For example, the exemplary disclosed embodiments are described in terms of interference-to-noise power contours, although those skilled in the art will appreciate that other criteria, such as signal-to-noise or carrier-to-noise ratios, compared to a threshold value may be used to determine the contours for incumbent users consistent with the disclosed embodiments herein. The limitations in the claims are to be interpreted broadly based on the language employed in the claims and not limited to examples described in the present specification or during the prosecution of the application. The examples are to be construed as non-exclusive. Furthermore, the steps of the disclosed routines may be modified in any manner, including by reordering steps, performing steps in parallel, and/or inserting or deleting steps. It is intended, therefore, that the specification and examples be considered as illustrative only, with a true scope and spirit being indicated by the following claims and their full scope of equivalents.

What is claimed is:

1. A cloud-based method for assigning shared spectrum resources to secondary users, the method comprising:
   receiving, by a central block entity, a request for channel availability from a secondary user to access a shared spectrum in a wireless network;
   authenticating the secondary user;
   validating the secondary user;
   routing the request for channel availability to a managing block entity, wherein the managing block entity is configured to determine available frequency information based on one or more parameters associated with the secondary user;
   receiving the available frequency information from the managing block entity;
   assigning a frequency and an effective isotropic radiated power (EIRP) to the secondary user based on the available frequency information from the managing block entity; and
   transmitting, to the secondary user, a channel availability response based on the assigned EIRP, wherein the channel availability response comprises the assigned frequency on which the secondary user can transmit.

2. The method of claim 1, wherein a plurality of primary users are partitioned into geographical regions, and the managing block entity is associated with a subset of the plurality of primary users in a non-overlapping geographical region.

3. The method of claim 1, wherein assigning the EIRP to the secondary user further comprises:
   receiving one or more EIRPs associated with the secondary user from one or more managing block entities;
   determining a minimum EIRP from the one or more received EIRPs; and
   assigning the minimum EIRP to the secondary user.

4. The method of claim 1, wherein:
the managing block entity is associated with a geographical region of primary users,
the managing block entity is further configured to:
   determine a list of secondary users within the geographical region that causes an aggregate interference to the primary users to exceed a predetermined threshold; and
   transmit the list to the central block entity, and
the central block entity is configured to suspend, terminate, reassign, or reauthorize the secondary users in the list using a heartbeat exchange.

5. The method of claim 1, wherein the managing block entity is further configured to perform distributed coexistence calculations at fixed times among a set of secondary users within a predetermined distance from a regional boundary of the managing block entity.

6. The method of claim 5, wherein performing distributed coexistence calculations comprises determining interference from one secondary user to another secondary user within the predetermined distance from the regional boundary of the managing block entity.

7. The method of claim 5, wherein the managing block entity is further configured to determine a list of all pairs of secondary users that interfere with each other within the predetermined distance from the regional boundary of the managing block entity.

8. The method of claim 7, wherein the managing block entity is further configured to:
compute a coverage contour associated with each of the secondary users;
determine whether the coverage contours overlap with one another by a predetermined amount; and
determine the list of all pairs of secondary users that interfere with each other based on the overlaps in the coverage contours.

9. The method of claim 1, wherein the managing block entity is further configured to determine whether the secondary user is authorized to immediately transmit the frequency or whether the secondary user needs to wait before transmitting on the frequency.

10. The method of claim 1, wherein at least one of the managing block entity or one or more secondary block entities is configured to:
compute a coverage contour associated with each secondary user within a respective geographical region;
calculate, via a link budget, an interference caused by each secondary user to one or more primary users within the respective geographical region; and
update a Radio Environment Map (REM) based on the calculated interference to manage spectrum access.

11. The method of claim 1, wherein the one or more parameters associated with the secondary user comprises at least one of an antenna gain of the secondary user, a transmit power of the secondary user, or a radio frequency (RF) propagation model of the secondary user.

12. The method of claim 1, wherein at least one of the central block entity, the managing block entity, or one or more secondary block entities comprises one or more redundant processors and one or more redundant databases.

13. The method of claim 1, wherein the managing block entity is further configured to transmit the channel availability response to the secondary user.

14. A cloud-based system for assigning shared spectrum resources to secondary users, the system comprising:
a central block entity, comprising:
   one or more processors; and
   a memory storing instructions that, when executed by the one or more processors of the central block entity, cause the central block entity to:
      receive a request for channel availability from a secondary user to access a shared spectrum in a wireless network;
      authenticate the secondary user; and
      validate the secondary user; and
one or more block entities, comprising:
   one or more processors; and
   a memory storing instructions that, when executed by the one or more processors of the one or more block entities, cause the one or more block entities to:
      receive the request for channel availability from the central entity;
      determine available frequency information based on one or more parameters associated with the secondary user; and
      transmit the available frequency information to the central entity,
wherein the memory of the central entity stores instructions that, when executed by the one or more processors of the central entity, cause the central entity to:
   assign a frequency and an effective isotropic radiated power (EIRP) to the secondary user based on the available frequency information from the one or more block entities; and
   transmit, to the secondary user, a channel availability response based on the assigned EIRP, wherein the channel availability response comprises the assigned frequency on which the secondary user can transmit.

15. The system of claim 14, wherein a plurality of primary users are partitioned into geographical regions, and the one or more block entities is associated with a respective subset of the plurality of primary users in a non-overlapping geographical region.

16. The system of claim 14, wherein assigning the EIRP to the secondary user further comprises:
receiving one or more EIRPs associated with the secondary user from the one or more block entities;
determining a minimum EIRP from the one or more received EIRPs; and
assigning the minimum EIRP to the secondary user.

17. The system of claim 14, wherein:
the one or more block entities is associated with a respective geographical region of primary users,
the memory of the one or more block entities stores instructions that, when executed by the one or more processors of the one or more block entities, cause the one or more block entities to:
   determine a list of secondary users within the geographical region that causes an aggregate interference to the primary users to exceed a predetermined threshold; and
   transmit the list to the central block entity, and
the memory of the central entity stores instructions that, when executed by the one or more processors of the central entity, cause the central entity to
   suspend, terminate, reassign, or reauthorize the secondary users in the list using a heartbeat exchange.

18. The system of claim 14, wherein the memory of the one or more block entities stores instructions that, when executed by the one or more processors of the one or more block entities, cause the one or more block entities to:
perform distributed coexistence calculations at fixed times among a set of secondary users within a predetermined distance from a regional boundary of the one or more block entities.

19. The system of claim 18, wherein performing distributed coexistence calculations comprises determining interference from one secondary user to another secondary user within the predetermined distance from the regional boundary of the managing block entity.

20. The system of claim 18, wherein the memory of the one or more block entities stores instructions that, when executed by the one or more processors of the one or more block entities, cause the one or more block entities to:
determine a list of all pairs of secondary users that interfere with each other within the predetermined distance from the regional boundary of the one or more block entities.

21. The system of claim 20, wherein the memory of the one or more block entities stores instructions that, when executed by the one or more processors of the one or more block entities, cause the one or more block entities to:
compute a coverage contour associated with each of the secondary users;
determine whether the coverage contours overlap with one another by a predetermined amount; and
determine the list of all pairs of secondary users that interfere with each other based on the overlaps in the coverage contours.

22. The system of claim 14, wherein the memory of the one or more block entities stores instructions that, when executed by the one or more processors of the one or more block entities, cause the one or more block entities to:
determine whether the secondary user is authorized to immediately transmit the frequency or whether the secondary user needs to wait before transmitting on the frequency.

23. The system of claim 14, wherein the memory of the one or more block entities stores instructions that, when executed by the one or more processors of the one or more block entities, cause the one or more block entities to:
compute a coverage contour associated with each secondary user within a respective geographical region;
calculate, via a link budget, an interference caused by each secondary user to one or more primary users within the respective geographical region; and
update a Radio Environment Map (REM) based on the calculated interference to manage spectrum access.

24. The system of claim 14, wherein the one or more parameters associated with the secondary user comprises at least one of an antenna gain of the secondary user, a transmit power of the secondary user, or a radio frequency (RF) propagation model of the secondary user.

25. The system of claim 14, wherein at least one of the central block entity or the one or more block entities comprises one or more redundant processors and one or more redundant databases.

26. The system of claim 14, wherein the memory of the one or more block entities stores instructions that, when executed by the one or more processors of the one or more block entities, cause the one or more block entities to:
transmit the channel availability response to the secondary user.

27. A non-transitory computer-readable medium comprising instructions that, when executed by at least one processor, cause the at least one processor to perform operations including:
receiving a request for channel availability from a secondary user to access a shared spectrum in a wireless network;
authenticating the secondary user;
validating the secondary user;
routing the request for channel availability to a managing block entity, wherein the managing block entity is configured to determine available frequency information based on one or more parameters associated with the secondary user;
receiving the available frequency information from the managing block entity;
assigning a frequency and an effective isotropic radiated power (EIRP) to the secondary user based on the available frequency information from the managing block entity; and
transmitting, to the secondary user, a channel availability response based on the assigned EIRP, wherein the channel availability response comprises the assigned frequency on which the secondary user can transmit.

28. The method of claim 5, wherein the managing block entity is further configured to transmit the coexistence calculations to the central block entity.

29. The method of claim 6, wherein at least one of the managing block entity or one or more secondary block entities is configured to update a Radio Environment Map (REM) based on the coexistence calculations.

30. The method of claim 7, wherein the managing block entity is further configured to transmit the list of all pairs of secondary users that interfere with each other to the central block entity.

31. The system of claim 18, wherein the memory of the one or more block entities stores instructions that, when executed by the one or more processors of the one or more block entities, cause the one or more block entities to transmit the coexistence calculations to the central block entity.

32. The system of claim 19, wherein the memory of the one or more block entities stores instructions that, when executed by the one or more processors of the one or more block entities, cause the one or more block entities to update a Radio Environment Map (REM) based on the coexistence calculations.

33. The system of claim 20, wherein the memory of the one or more block entities stores instructions that, when executed by the one or more processors of the one or more block entities, cause the one or more block entities to transmit the list of all pairs of secondary users that interfere with each other to the central block entity.

* * * * *